INVENTOR
Nathaniel D. Tenenbaum
ATTORNEY

United States Patent Office 3,496,417
Patented Feb. 17, 1970

3,496,417
ELECTRIC RELAY SYSTEM
Nathaniel D. Tenenbaum, Plainfield, N.J., assignor to Westinghouse Electric Corporation, East Pittsburgh, Pa., a corporation of Pennsylvania
Continuation of application Ser. No. 153,841, Nov. 21, 1961. This application Aug. 5, 1968, Ser. No. 757,186
Int. Cl. H02h 7/00; H01h 47/32, 47/00
U.S. Cl. 317—33
10 Claims

ABSTRACT OF THE DISCLOSURE

A protective relaying apparatus using a controlled rectifier as a gate device to prevent the operation of a solid state timing network as long as the line protected by the relaying apparatus is not faulted and to initiate the timing operation of the timing network in response to the flow of fault current in the protected line. The apparatus is further provided with means sensitive to the line current to terminate the conduction of the controlled rectifier and thereby reset the timing network if the fault disappears prior to the timing out of the timing network. The apparatus is also provided with a signal lamp which is illuminated solely after the timing network has timed out and a tripping unit has been actuated thereby. The signal lamp is not actuated if the breaker associated with the tripping unit is actuated by means other than the apparatus with which the signal lamp is associated.

---

This application is a continuation of my copending application Ser. No. 153,841 filed Nov. 21, 1961 for Electric Relay System, now abandoned.

Summary of the invention

This invention relates to the relaying of electric systems and it has particular relation to protective electric relays employing static components for protecting electric systems.

In accordance with the invention a direct voltage is derived which is dependent on a condition of an electric system which is to be protected. In accordance with one aspect of the invention this direct voltage may have its relation to the condition on which it is dependent varied or adjusted in order to provide a desired response or to assure proper coordination of various protective devices.

The direct voltage is employed for charging a suitable storage device such as a capacitor. The ability of the capacitor to store a charge is controlled by a switching device which in turn is controlled by the aforesaid direct voltage. The storage device or capacitor is employed for introducing a timing delay between the occurrence of a condition on the system to be protected and a remedial or consequent action controlled by such condition.

When the charge in the storage device or capacitor reaches a predetermined value a translating device such as a tripping unit may be energized for the purpose of isolating or segregating a portion of the electric system to be protected.

In order to minimize the energizing requirements energy is supplied to the tripping unit from a storage device such as a capacitor which may be charged. Upon any occurrence of a predetermined condition on the system to be protected the capacitor is discharged through one or more switches preferably in the form of controlled gate devices for the purpose of completing the tripping operation. A signalling device is provided to indicate that a tripping operation has been performed in response to the system condition.

It is therefore an object of the invention to provide an improved device for protecting an electric system.

It is also an object of the invention to provide an improved protective relaying combination employing static components for protecting an electric system wherein the response of the relaying combination to a condition of the system may be adjusted or selected for optimum results.

It is another object of the invention to provide a protective relaying combination for an electric system having a time delay response wherein the charging of a storage device is started accurately in response to a predetermined system condition.

It is an additional object of the invention to provide a protective relaying combination for an electric system which requires little energy in its operation.

It is a further object of the invention to provide an improved indicating system for indicating the operation of a protective relaying combination to trip a circuit breaker.

Other objects of the invention will be apparent from the following description taken in conjunction with the accompanying drawings, in which:

Detailed description

Figure 1:
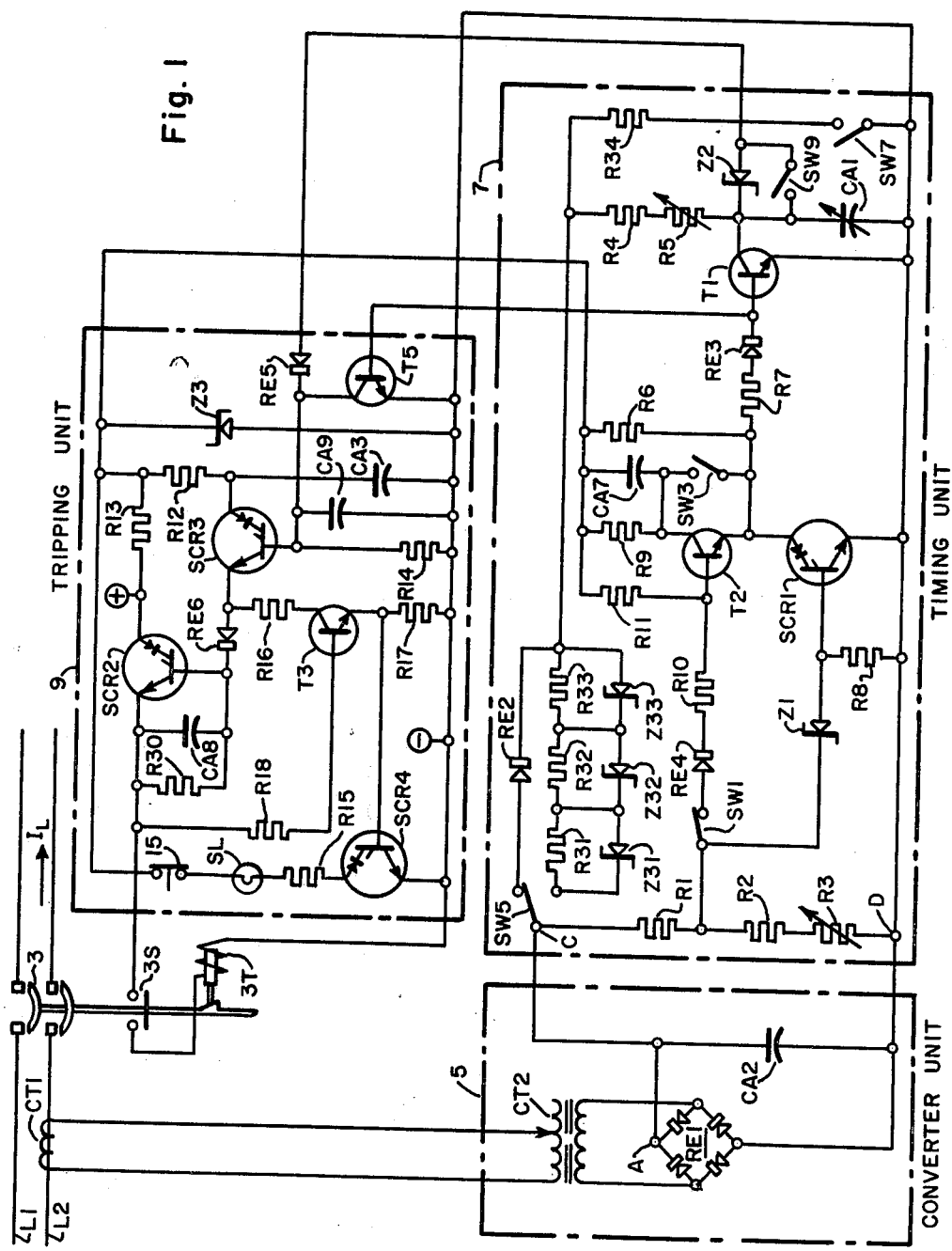
FIGURE 1 is a schematic view of an electric system embodying the invention.

FIGURE 1 shows a relaying combination which is associated with an electric system to be protected. This system may be of any type having a condition to which the relaying combination is to respond. For present purposes it will be assumed that the system is a single phase system operating at a frequency of 60 cycles per second and represented by two line conductors L1 and L2. These line conductors transmit alternating current $I_L$ from a suitable source to a load through a circuit breaker 3 having a trip coil 3T. The circuit breaker also has an auxiliary switch 3S which is open when the circuit breaker is in open condition and which is closed when the circuit breaker is in closed condition. The circuit breaker 3 is shown in its open condition.

The relaying combination is designed to respond to a suitable condition of the electric system which is to be protected. In a preferred embodiment of the invention the relaying combination comprises an overcurrent relay which responds to the line current $I_L$ flowing through the line conductors.

The relaying combination includes a converter unit 5 which derives from the line current $I_L$ a direct voltage which is applied between the points C and D. This direct voltage is applied to a timing unit 7 for the purpose of controlling the charging of a capacitor CA1. When the voltage across the capacitor CA1 exceeds a predetermined value a signal is applied to a tripping unit 9 for the purpose of initiating a tripping operation of the circuit breaker 3.

By inspection of FIGURE 1 it will be noted that a current transformer CT1 has its primary winding energized in accordance with the line current $I_L$. The secondary winding of the current transformer CT1 is connected to the primary winding of a transformer CT2 located in the converter unit. Preferably the primary winding of the current transformer CT2 has an adjustable number of turns to facilitate adjustment of the relay combination. The secondary winding of the transformer CT2 is connected to the input terminals of a rectifier RE1. This rectifier may be of any desired construction. Preferably it is a full wave rectifier and is illustrated as a rectifier of the bridge type in FIGURE 1. The output terminals AD of the rectifier RE1 are connected across a voltage divider represented by three resistors R1, R2 and R3. For the purpose of calibration at least one of these resistors, such as R3, preferably is adjustable. A filter capacitor CA2 is connected across the output terminals of the rectifier RE1 for the purpose of removing ripple from the output and assuring the supply of a ripple-free direct voltage across the voltage divider.

In the timing unit 7 the direct voltage appearing across the voltage divider is employed for charging a storage device such as the capacitor CA1. The charging circuit may be traced from the terminal A of the rectifier RE1 through a single-pole, double-throw switch SW5, rectifier RE2, resistors R4 and R5 and the capacitor CA1 to the terminal D. At least one of the resistors R5 or R4 preferably is adjustable to facilitate calibration. Thus, adjustment of the resistor R5 adjusts the rate of charge of the capacitor CA1 and the time required for the capacitor to reach a predetermined terminal voltage. The time also may be adjusted by adjustment of the capacitance of the capacitor CA1.

For small values of the line current $I_L$ the capacitor CA1 is shunted by a suitable switch which preferably takes the form of the output circuit of a transistor T1. Although the circuits may be arranged for a transistor of the PNP type it will be assumed that the transistor T1 is an NPN type transistor. As shown in FIGURE 1 the collector of the transistor T1 is connected to the upper terminal of the capacitor CA1 whereas the emitter of the transistor is connected to the lower terminal of the capacitor.

For small values of line current $I_L$ sufficient current is transmitted through the input or control circuit of the transistor T1 to place the transistor in conductive condition and thus to assure maintenance of the capacitor CA1 in a discharged condition. The input or control circuit for the transistor may be traced from the positive terminal of a source of direct voltage represented by a positive polarity marking (+) through a resistor R13, a resistor R6, a resistor R7, a rectifier RE3, a base electrode of the transistor, and the emitter electrode of the transistor to the negative terminal of the source of direct voltage represented by a negative polarity marking (−).

When the capacitor CA1 is to start a timing operation, a switch is closed to shunt the input or control circuit of the transistor T1. This turns the transistor T1 off and permits the capacitor CA1 to charge. The shunting of the transistor preferably is by a silicon controlled rectifier SCR1. This controlled rectifier has its anode connected to a point intermediate the resistors R6 and R7. The controlled rectifier has a cathode connected to the emitter of the transistor T1. The gate of the controlled rectifier is connected to a point intermediate the resistors R1 and R2 through a minimum voltage or transfer device Z1.

For low values of voltage thereacross the minimum voltage device Z1 is in effect an insulator and blocks the flow of current therethrough. When the voltage thereacross rises above a predetermined value the device Z1 breaks down to exhibit a relatively low resistance to the flow of current. When the voltage thereacross drops below the predetermined value the device Z1 recovers its insulating properties. In a preferred embodiment of the invention this device takes the form of a Zener diode. A resistor R8 is connected between the gate and cathode of the controlled rectifier SCR1.

When current starts to flow between the anode and cathode of the silicon controlled rectifier the gate loses control. In order to restore the gate control of the controlled rectifier a switch is included in the output circuit of the controlled rectifier for the purpose of interrupting the flow of the output circuit current. In one embodiment of the invention the switch takes the form of a transistor T2 which may be similar to the transistor T1. The transistor T2 has its emitter connected to the anode of the controlled rectifier and has its collector connected to the positive terminal of the source of direct voltage through a resistor R9. A point intermediate the resistors R1 and R2 is connected to the base electrode of the transistor T2 through a single-pole, single-throw switch SW1, a rectifier RE4 and a resistor R10. In addition, the base electrode is connected to the positive terminal of the source of direct voltage through the resistors R11 and R13.

The operation of the timing unit now will be briefly reviewed. It will be assumed that the value of line current $I_L$ flowing is too small to result in turn on of the transistor T2 and the controlled rectifier SCR1. Because of the current flowing from the positive terminal through the resistor R13, the resistor R6, the resistor R7, the rectifier RE3, the base electrode and emitter electrode of the transistor T1 to the negative terminal of the source of direct voltage, the transistor T1 is turned on and establishes a low resistance path across the capacitor CA1. Consequently, the capacitor CA1 is in discharged condition.

It will be assumed next that the line current $I_L$ increases until it reaches fault values. As the current increases a stage is reached at which the transistor T2 begins to turn on. Shortly thereafter the voltage across the Zener diode Z1 breaks down the diode and current flows from the voltage divider through the Zener diode Z1 and the resistor R8 back to the lower terminal of the voltage divider. The voltage drop across the resistor R8 turns on the controlled rectifier SCR1 and current now flows from the positive terminal of the source of direct voltage through the resistors R13 and R9, the collector and emitter electrodes of the transistor T2, and the anode and cathode electrodes of the controlled rectifier to the negative terminal of the source of direct voltage.

Because of the low voltage appearing between the anode and cathode of the controlled rectifier SCR1 the current flowing through the base of the transistor T1 drops sufficiently to turn off the transistor. Since the transistor T1 now represents a high resistance across the capacitor CA1 this capacitor starts to charge.

The voltage across the capacitor increases until a minimum voltage device Z2 breaks down. This minimum voltage device may be similar in construction to the device Z1. When the device Z2 breaks down the timing unit 7 delivers an input to the tripping unit 9.

Let it be assumed now that the line current $I_L$ starts to drop either after or before the capacitor CA1 is charged sufficiently to result in break down of the device Z2. When the line current drops to a predetermined value the Zener diode Z1 is restored to its blocking condition. However, since the gate of the controlled rectifier SCR1 has lost control of the current flow between the anode and cathode electrodes the recovery of the Zener diode does not interrupt the flow of current in the output circuit in the output circuit of the controlled rectifier.

Shortly afterwards the line current $I_L$ drops sufficiently to result in turn off of the transistor T2. Such turn off interrupts the flow of current in the output circuit of the controlled rectifier and this controlled rectifier now is restored to control by its gate. Current flow through the resistor R6 is insufficient to keep the controlled rectifier SCR1 in conducting condition. The resistor R11 limits current flow therethrough to an exceedingly small value which is insufficient in itself to maintain the transistor T2 in conductive condition.

Inasmuch as the controlled rectifier SCR1 is in blocking condition sufficient current flows through the circuit represented by the resistors R13, R6, R7, the rectifier RE3, and the base and emitter electrodes of the transistor T1 to turn on the transistor. The transistor now establishes a low resistance shunt across the capacitor CA1 and the capacitor CA1 is rapidly discharged through the transistor. This completes a cycle of operation of the timing unit 7.

If desired, the diode RE3 may take the form of a Zener diode which breaks down when the transistor T1 is to turn on. When the controlled rectifier SCR1 fires, the Zener diode then regains its blocking condition to provide a somewhat sharper cutoff of the transistor T1. When the timing unit 7 delivers an input to the tripping unit 9 the tripping unit trips the circuit breaker 3. This tripping unit is energized from a source of direct voltage such as a station battery. The source is represented in FIGURE 1 by positive and negative polarity markings.

In order to reduce the drain on the source of direct voltage for the tripping unit 9 a storage device CA3 is provided which may be charged from the source of direct voltage and which may be discharged during the short time required to trip the circuit breaker. In a preferred embodiment of the invention the storage device takes the form of a capacitor which is connected across the source of direct voltage through resistors R12 and R13. These resistors limit the charging current to a small value and consequently assure a low drain on the source of direct voltage.

Preferably the capacitor CA3 is charged to a definite voltage. In a preferred embodiment of the invention such charging is assured by connecting a definite voltage device Z3 across the resistor R12 and the capacitor CA3. The definite voltage device Z3 may be a Zener diode similar to the device Z1. The Zener diode Z3 breaks down to maintain a constant voltage across the terminals. The resistor R13 limits the current supplied to the Zener diode Z3 to a small value.

A trip coil 3T of the circuit breaker 3 is connected across the source of direct voltage through the auxiliary switch 3S and a control switch SCR2 which is closed when the circuit breaker is to be tripped. Preferably the switch SCR2 is a silicon controlled rectifier similar to the controlled rectifier SCR1. The output circuit of the controlled rectifier SCR2 may be traced from the positive terminal (+) of the source of direct voltage through the anode and cathode of the controlled rectifier SCR2, the auxiliary switch 3S and the trip coil 3T to the negative terminal (−) of the source of direct voltage. A resistor R30 and a capacitor CA8 are connected in parallel across the gate and cathode of the controlled rectifier.

When the controlled rectifier SCR2 is to be fired a switch SCR3 is closed which connects a point intermediate the capacitor CA3 and the resistor R12 to the gate of the controlled rectifier SCR2 through a rectifier RE6. This establishes a discharge circuit for the capacitor CA3 which may be traced from the upper terminal of the capacitor through the switch SCR3, the rectifier RE6, the resistor R30, the auxiliary switch 3S and the trip coil 3T to the lower terminal of the capacitor CA3. Sufficient current passes through this circuit to produce a voltage across the resistor R30 which fires the controlled rectifier SCR2 and this controlled rectifier connects the trip coil 3T across the source of direct voltage to assure tripping of the circuit breaker. The capacitor CA8 establishes a bypass circuit for alternating current components across the resistor R30.

Preferably the switch SCR3 takes the form of a silicon controlled rectifier similar to the controlled rectifier SCR1. As shown in FIGURE 1, the anode of the control rectifier SCR3 is connected to the point intermediate the capacitor CA3 and the resistor R12 whereas the cathode is connected to the rectifier RE6. The gate of the controlled rectifier SCR3 is connected through a resistor R14 to the lower terminal of the capacitor CA1 and is also connected to the rectifier RE5. A capacitor CA9 across the resistor R14 assures a slight time delay in the firing of the controlled rectifier SCR3. This prevents firing of the controlled rectifier by a brief transient.

A transistor T5 has its collector and emitter connected respectively to the terminals of the capacitor CA9. The base of this transistor is connected to the base of the transistor T1. Consequently, when the transistor T1 turns on to discharge the capacitor CA1 the transistor T5 turns on to discharge the capacitor CA9. When the transistor T1 turns off to permit a timing operation the transistor T5 also turns off to place the controlled rectifier SCR3 in effective condition.

When the Zener diode Z2 breaks down current flows from the capacitor CA1 through the resistor R14. The voltage drop across the resistor R14 supplies an input or control current to the silicon controlled rectifier SCR3 through a circuit which may be traced from the upper terminal of the resistor R14 through the gate and cathode of the controlled rectifier SCR3, the rectifier RE6, the resistor R30, the auxiliary switch 3S and the trip coil 3T to the lower terminal of the resistor R14. Although this current may be insufficient to trip the circuit breaker it suffices to turn on the controlled rectifier SCR3 and this assures firing of the controlled rectifier SCR2 in the manner previously discussed.

In order to signal a tripping operation of the circuit breaker 3 a suitable signal SL is provided. This signal may be of any type which may be detected by a person. In the embodiment of FIGURE 1 the signal takes the form of a lamp which is illuminated to indicate that the circuit breaker 3 has been tripped. The lamp is illuminated by closure of a switch SCR4 which preferably is a silicon controlled rectifier similar to the previously described rectifier SCR1. When the controlled rectifier SCR4 fires it completes an energizing circuit for the lamp which may be traced from the positive terminal (+) of the source of direct voltage through the resistor R13, a resetting switch 15, the lamp SL, a resistor R15 and the anode and cathode of the controlled rectifier SCR4 to the negative terminal (−) of the source of direct voltage.

It will be recalled that when the controlled rectifier SCR4 fires, its gate loses control. Consequently the lamp SL remains illuminated until the resetting switch 15 is manually operated to open the circuit of the lamp.

It is desirable that the lamp SL be illuminated only when the circuit breaker 3 is tripped by the specific relay unit associated with the lamp. If a circuit breaker is tripped manually or by another relay unit the lamp SL should not illuminate. To this end the controlled rectifier SCR4 is fired to illuminate the lamp only if the controlled rectifiers SCR2 and SCR3 have fired to trip the associated circuit breaker 3. The firing of the controlled rectifier SCR4 is controlled through a switch preferably in the form of a transistor T3 which may be similar in construction to the transistor T1. The collector of the transistor T3 is connected to a point intermediate the cathode of the controlled rectifier SCR3 and the rectifier RE6 through a resistor R16. The emitter of the transistor T3 is connected to the cathode of the controlled rectifier SCR4 through a resistor R17. The base of the transistor T3 is connected to the cathode of the controlled rectifier SCR2 through a resistor R18.

When the controlled rectifier SCR2 fires to trip the circuit breaker 3 the upper terminal of the resistor R18 is in effect connected to the positive terminal (+) of the source of direct voltage. Sufficient current now flows from the positive terminal (+) through the anode and cathode of the controlled rectifier SCR2, the resistor R18, the base and emitter of the transmitter T3 and the resistor R17 to the negative terminal (−) of the source of direct voltage to turn on the transistor T3. Inasmuch as the controlled rectifier SCR3 also is in firing condition at this time current flows from the upper terminal of the capacitor CA3 through the anode and cathode of the controlled rectifier SCR3, the resistor R16, the collector and emitter of the transistor T3 and the resistor R17 to the lower terminal of the capacitor CA3. The resulting voltage drop across the resistor R17 suffices to turn on the controlled rectifier SCR4 and this controlled rectifier consequently fires to illuminate the lamp SL.

The operation of the complete system now will be reviewed briefly. It will be assumed that the circuit breaker 3 is in tripped condition as illustrated and that the resetting switch 15 has been operated to extinguish the lamp SL and turn off the controlled rectifier SCR4. The transistors T1 and T5 are in their on conditions and the capacitors CA1 and CA9 consequently are discharged. All other transistors and controlled rectifiers are in their off conditions.

It will be assumed next that the circuit breaker 3 is closed and that small values of line current $I_L$ flow. A direct voltage now appears across the voltage divider R1, R2 and R3 which is dependent on the line current $I_L$.

It will be assumed next that the line current $I_L$ increases until it reaches fault proportions. As the line current increases a point is reached at which the voltage across the resistors R2 and R3 becomes sufficient to start to turn on the transistor T2. Shortly afterwards this voltage reaches a value sufficient to break down the Zener diode Z1 and thus turn on the controlled rectifier SCR1.

The shunting effect of the controlled rectifier SCR1 now drops the base current of the transistors T1 and T5 sufficiently to turn off the transistors. Consequently the capacitor CA1 now starts to charge through the rectifier RE2 and the resistors R4 and R5 at a rate dependent on the magnitude of the line current $I_L$.

When the voltage across the capacitor CA1 reaches a magnitude sufficient to cause break-down of the Zener diode Z2 sufficient current flows through the gates of the controlled rectifiers SCR3 and SCR2 to turn both of these controlled rectifiers on after the slight delay introduced by the capacitor CA9. The turning on of the controlled rectifier SCR2 assures tripping of the circuit breaker 3. It also turns on the transistor T3 and current is supplied to the output circuit of the transistor T3 through the controlled rectifier SCR3. This current produces a drop across the resistor R17 sufficient to turn on the controlled rectifier SCR4. The lamp SL now is illuminated to indicate that the circuit breaker 3 has been tripped by an associated relay unit.

In opening, the circuit breaker 3 interrupts the flow of line current $I_L$. Consequently the voltage across the voltage divider R1, R2 and R3 drops to zero. This turns off the transistor T2 and the controlled rectifier SCR1. Inasmuch as the controlled rectifier SCR1 is turned off sufficient current now flows through the emitters of the transistors T1 and T5 to turn on the transistors. The transistors promptly discharge the capacitors CA1 and CA9.

As a result of the opening of the switch 3S of the circuit breaker 3 the currents flowing through the output circuits of the controlled rectifiers SCR2 and SCR3 drop to values insufficient to maintain these controlled rectifiers in their fired conditions. Consequently the gates of these controlled rectifiers regain control. The controlled rectifiers SCR2 and SCR3 return to their off conditions. This completes a cycle of operation of the system of FIGURE 1.

In relay design it is desirable to match certain curves or to provide a predetermined relation between certain variable quantities such as the relation between the line current and input to the timing unit. For example, such matching is desirable in order to insure proper coordination among relays employed for protecting an electrical system.

Figure 2:
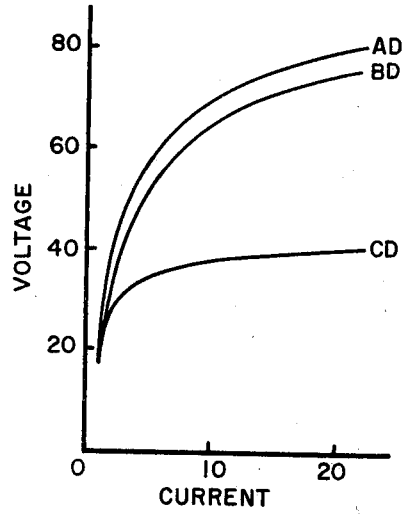
FIG. 2 is a graphical representation showing certain voltage and current relationships which are useful in explaining the invention.

In FIGURE 2 certain relations are shown graphically between line current and voltages supplied to the timing unit. In FIGURE 2, abscissas represent multiples of the minimum line current required to perform a tripping operation of the circuit breaker 3. Ordinates represent values of voltage.

The curve CD in FIGURE 2 represents the relationship between the voltage appearing across the voltage divider R1, R2 and R3 relative to multiples of minimum pickup current which may be desirable for relaying purposes. Such a curve is difficult to obtain by control of the saturation of the transformer CT2 alone.

Figure 3:
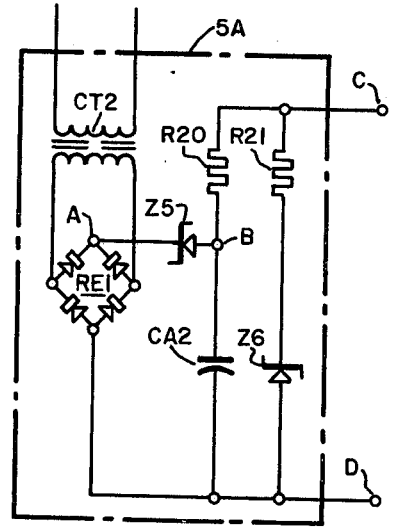
FIG. 3 is a schematic view of a system illustrating a modified form of the invention.

In accordance with the present invention the transformer CT2 is designed to provide a voltage between the points A and D, the rectifier output terminals, which is represented in FIGURE 2 by the curve AD. Such a curve is readily obtained by proper design of the saturation of the transformer. In order to obtain the curve CD of FIGURE 2 a shaping network is employed which is illustrated in FIGURE 3. FIGURE 3 shows a converter unit 5A which may be employed in place of the converter unit 5 of FIGURE 1.

In FIGURE 3 the output of the rectifier RE1 is connected across the points C and D through a definite voltage device Z5 and a resistor R20. The definite voltage device Z5 is designed to break down and maintain a substantially constant voltage thereacross substantially over the operating range of the relay unit. Thus, the Zener diode Z5 in effect subtracts a definite voltage from the output of the rectifier RE1 and the voltage across the points B and D may be as represented in the curve BD of FIGURE 2.

As shown in FIGURE 3 a resistor R21 is connected between the points C and D through a minimum voltage device Z6 which breaks down to pass current when the voltage thereacross exceeds a predetermined value. The minimum voltage device Z6 may take the form of a Zener diode. When the Zener diode Z6 breaks down the current through the resistor R20 is substantially increased and the voltage drop across the resistor also is increased. The effect of the increased voltage drop across the resistor R20 is to provide a voltage between the points C and D which is represented by the curve CD in FIGURE 2. Thus by proper selection of the components of the shaping network the desired relationship between voltage and minimum trip current may be obtained.

The shaping thus far described for FIGURE 3 is suitable for a relay known as a "definite time" or "CO–6" relay. Characteristic curves for such a relay are well known and will be found in performance data Bulletin 41–100, September 1961, page 3, published by Westinghouse Electric Corporation, Newark, N.J.

Other shapings may be obtained by appropriate circuits. For example, if in FIGURE 1 the switch SW5 is operated to its lower position, and if a single-pole, single-throw switch SW7 is closed, a shaping is obtained which is suitable for what is known as an "extremely inverse time" or "CO–11" relay. Characteristic curves for such a relay are shown in the aforesaid bulletin.

With the switch SW5 in its lower position and the switch SW7 closed, the output of the rectifier RE1 is connected across the resistor R34 through three resistors R31, R32 and R33 in series. Zener diodes Z31, Z32, and Z33 respectively shunt the resistors R31, R32 and R33. The voltage across the resistor R34 is applied across the capacitor CA1 through the resistors R4 and R5.

As the line current increases from a small value, the voltage across the resistor R31 reaches a value at which the Zener diode Z31 breaks down effectively to shunt the resistor. As the line current continues to increase the Zener diodes Z32 and Z33 successively breakdown effectively to shunt their associated resistors. By proper selection of the resistance values and of the break-down voltages of the Zener diodes the relay response may be shaped to match the desired curves for the extremely inverse time relay. The Zener diode Z2 may be effectively removed from the system as by closure of a switch SW9 if the tripping unit is designed to respond to the desired value of voltage across the capacitor CA1.

By proper selection of circuit components the transistor T2 may be omitted. Let it be assumed that the switch SW1 is open and that the switch SW3 is closed, effectively, removing the transistor T2 from the system, and that the controlled rectifier SCR1 is designed for a current of the order of 200 milliamperes. The resistor R9 has a resistance such as 12,000 ohms. Preferably the capacitor CA7 has a substantial capacitance, such as 47 microfarads. The capacitor in parallel with the relatively high resistance of the resistor R9 allows the controlled rectifier to be turned on and off depending on the signal at the gate of the controlled rectifier. When the Zener diode Z1 breaks down the controlled rectifier fires. When the voltage across the Zener diode Z1 falls below the break-down point the controlled rectifiers SCR1 turns off.

If the relay is not to be employed in a substantially constant-temperature environment compensation preferably is provided in the gate circuits of the more critical controlled rectifiers for variations in properties due to temperature changes. To compensate for the variation in firing response of the controlled rectifier SCR3 with temperature all or a substantial portion of the resistor R14 may be replaced by a material having a negative temperature coefficient of resistance such as a thermistor. Similarly a portion of the resistor R8 may be replaced or shunted by a resistor having a negative temperature coefficient of resistance to compensate for variation in firing characteristics of the controlled rectifier SCR3 with temperature.

Figure 4:
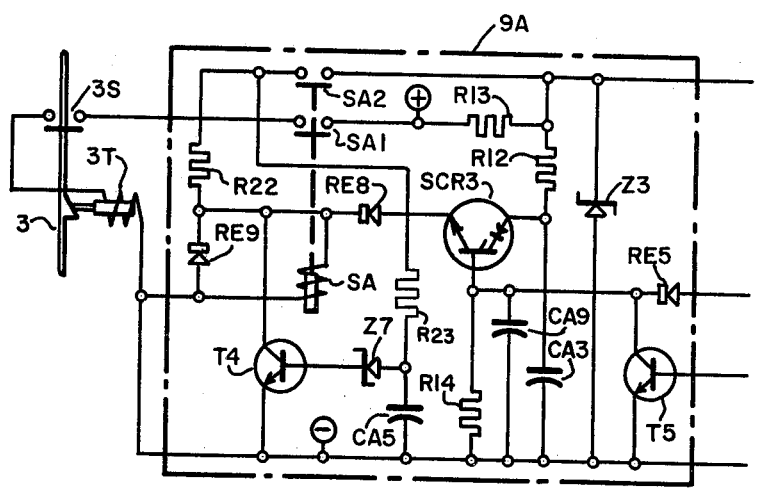
FIG. 4 is a schematic view illustrating a further modified embodiment of the invention.

FIGURE 4 shows a modified tripping unit 9A which may be employed in place of the tripping unit 9 of FIGURE 1. In FIGURE 4 the rectifier RE5, the Zener diode Z3, the resistors R12, R13 and R14, the capacitors CA3 and CA9, the transistor T5 and the silicon controlled rectifier SCR3 are employed and are associated in the same manner shown in FIGURE 1. However, in FIGURE 4 the cathode of the silicon controlled rectifier SCR3 is connected to the negative terminal (—) of the source of direct voltage through a rectifier RE8 and the operating coil of a relay SA. Consequently, when the silicon controlled rectifier SCR3 fires it picks up the relay SA to close the make relay contacts SA1 and SA2. Closing of the make contacts SA1 connects the trip coil 3T across the source of direct voltage through the switch 3S. Also closure of the make contacts SA2 completes a holding circuit for the relay which may be traced from the positive terminal (+) of the source of direct voltage through the resistor R13, the contacts SA2, a resistor R22, the operating coil of the relay SA to the negative terminal (—) of the source of direct voltage. A rectifier RE9 may be connected across the coil of the relay SA to provide a discharge path for stored energy when the coil is to be deenergized.

In order to reset the relay SA the switch T4 is provided for shunting the operating coil of the relay. Preferably the switch is in the form of a transistor similar to the transistor T1 of FIGURE 1. The collector and emitter of the transistor are connected to the terminals of the coil of the relay as shown. The base and emitter of the transistor T4 are connected across a capacitor CA5 through a minimum voltage device such as a Zener diode Z7.

The capacitor CA5 is located in a charging circuit which may be traced from the positive terminal (+) of the source of direct voltage through the resistor R13, the contacts SA2, a resistor R23 and the capacitor CA5 to the negative terminal (—) of the source. Thus the charging circuit is completed by operation of the relay SA.

After completion of the charging circuit the capacitor CA5 charges for a time sufficient to assure tripping of the circuit breaker. The voltage across the capacitor then becomes sufficient to break down the Zener diode Z7. The ensuing discharge through the Zener diode and the transistor base-emitter circuit turns on the transistor T4 to shunt the operating coil of the relay SA. The drop out of the relay restores the tripping unit 9A to the condition illustration in FIGURE 4.

Although the invention has been described with reference to certain specific embodiments thereof, numerous modifications falling within the spirit and scope of the invention are possible.

I claim as my invention:

1. In a protective-relaying combination for responding with time delay to a variable quantity in an electrical system, means for deriving a direct voltage dependent on said quantity, a first transistor having an input circuit and an output circuit, a controlled rectifier having an input circuit and an output circuit, said last-named input circuit when energized being effective for initiating an output in said last-named output circuit and thereafter losing control of said last-named output until the rectifier is reset, means connecting said output circuits in series whereby said first transistor may be controlled to reset the rectifier, a minimum voltage device effective for passing substantial current only if the voltage thereacross equals at least a predetermined minimum value, means connecting the rectifier input circuit through the minimum voltage device for energization in accordance with the direct voltage, means connecting the transistor input circuit for energization in accordance with the direct voltage to turn off the rectifier when the direct voltage drops below a predetermined value, a capacitor, means coupling the capacitor to be charged in accordance with the direct voltage, a second transistor having an output circuit shunting said capacitor and an input circuit, means connecting the input circuit of the second transistor for energization in accordance with the voltage across the output circuit of the rectifier, and translating means responsive to the voltage across said capacitor.

2. In a protective-relaying combination for responding with time delay to a variable quantity in an electrical system, means for deriving a direct voltage dependent on said quantity, a first transistor having an input circuit and an output circuit, a controlled rectifier having an input circuit and an output circuit, said last-named circuit when energized being effective for initiating an output in the last-named output circuit and thereafter losing control of said output until the rectifier is reset, means connecting said output circuits in series whereby said first transistor may be controlled to reset the rectifier, a minimum voltage device effective for passing substantial current only if the voltage thereacross equals at least a predetermined minimum value, means connecting the rectifier input circuit through the minimum voltage device for energization in accordance with the direct voltage, means connecting the transistor input circuit for energization in accordance with the direct voltage to turn off the rectifier when the direct voltage drops below a predetermined value, a capacitor, means coupling the capacitor to be charged in accordance with the direct voltage, a second transistor having an output circuit shunting said capacitor, means connecting the input circuit of the second transistor for energization in accordance with the voltage across the output circuit of the rectifier, a second capacitor, means for charging said capacitor from a source of direct current, a second controlled rectifier, a third controlled rectifier, a circuit breaker having a trip coil connected for energization through the output circuit of the third controlled rectifier, means connecting the input circuit of the third controlled rectifier through the output circuit of the second controlled rectifier for energization in accordance with the charge in the second capacitor, a second minimum voltage device effective for passing substantial current only if the voltage thereacross equals at least a predetermined minimum value, and means connecting the input circuit of the second controlled rectifier through the second minimum voltage device for energization in accordance with the voltage across the first-named capacitor.

3. In a protective-relaying combination for responding with time delay to a variable quantity in an electrical system, means for deriving a direct voltage dependent on said quantity, a first transistor having an input circuit and an output circuit, a controlled rectifier having an input circuit and an output circuit, said last-named input circuit when energized being effective for initiating an output in said last-named output circuit and thereafter losing control of said output until the rectifier is reset, means connecting said output circuits in series whereby said first transistor may be controlled to reset the rectifier, a minimum voltage device effective for passing substantial current only if the voltage thereacross equals at least a predetermined minimum value, means connecting the rectifier input circuit through the minimum voltage device for energization in accordance with the direct voltage, means connecting the transistor input circuit for energization in accordance with the direct voltage to turn off the rectifier when the direct voltage drops below a predetermined value, a capacitor, means coupling the capacitor to be charged in accordance with the direct voltage, a second transistor having an output circuit shunting said capacitor, means connecting the input circuit of the second transistor for energization in accordance with the voltage across the output circuit of the rectifier, a second capacitor, means for charging said capacitor from a source of direct current, a second controlled rectifier, a third controlled rectifier, a circuit breaker having a trip coil and a switch which is closed when the circuit breaker is closed and open when the circuit breaker is open, said trip coil being connected for energization through the output circuit of the third controlled rectifier and said switch, means connecting the input circuit of the third controlled rectifier through the output circuit of the second controlled rectifier for energization in accordance with the charge in the second capacitor, a second minimum voltage device effective for passing substantial current only if the voltage thereacross equals at least a predetermined minimum value, means connecting the input circuit of the second controlled rectifier through the second minimum voltage device for energization in accordance with the voltage across the first-named capacitor, a fourth controlled rectifier having an input circuit and an output circuit, a signal device, means connecting the signal device across a source of voltage through the output circuit of the fourth controlled rectifier, a third transistor having an input circuit and an output circuit, means connecting the input circuit of the fourth controlled rectifier for energization from the second capacitor through the output circuits of the third transistor and the second controlled rectifier in series, and means energizing the input circuit of the third transistor in accordance with the voltage applied to the trip coil and the switch.

4. In a protective-relaying combination for responding with time delay to a variable quantity in an electrical system, means for deriving a first direct voltage dependent on said quantity, said means comprising means for deriving a second direct voltage dependent on said quantity, first and second definite voltage devices each effective for maintaining a definite voltage thereacross when current passes therethrough first and second resistors, means connecting the second direct voltage through the first definite voltage device and the first resistor in series across the second minimum voltage device and the second resistor in series to produce the first direct voltage across the second minimum voltage device and the second resistor in series, a first transistor having an input circuit and an output circuit, a controlled rectifier having an input circuit and an output circuit, said last-named input circuit when energized being effective for initiating an output in said last-named output circuit and thereafter losing control of said last-named output until the rectifier is reset, means connecting said output circuits in series whereby said first transistor may be controlled to reset the rectifier, a minimum voltage device effective for passing substantial current only if the voltage thereacross equals at least a predetermined minimum value, means connecting the rectifier input circuit through the minimum voltage device for energization in accordance with the first direct voltage, means connecting the transistor input circuit for energization in accordance with the first direct voltage to turn on the rectifier when the first direct voltage drops below a predetermined value, a capacitor, means coupling the capacitor to be charged in accordance with the first direct voltage, a second transistor having an output circuit shunting said capacitor, means connecting the input circuit of the second transistor for energization in accordance with the voltage across the output circuit of the rectifier, a second capacitor, means for charging said capacitor from a source of direct current, a second controlled rectifier, a third controlled rectifier, a circuit breaker having a trip coil and having a switch which is closed and open respectively when the circuit breaker is closed and open, said trip coil being connected for energization through the output circuit of the third controlled rectifier and the switch, means connecting the input circuit of the third controlled rectifier for energization through the output circuit of the second controlled rectifier in accordance with the charge in the second capacitor, a second minimum voltage device effective for passing substantial current only if the voltage thereacross equals at least a predetermined minimum value, means connecting the input circuit of the second controlled rectifier through the second minimum voltage device for energization in accordance with the voltage across the first-named capacitor, a fourth controlled rectifier having an input circuit and an output circuit, a signal device, means connecting the signal device across a source of voltage through the output circuit of the fourth controlled rectifier, a third transistor having an input circuit and an output circuit, means connecting the input circuit of the fourth controlled rectifier for energization from the second capacitor through the output circuits of the third transistor and the second controlled rectifier in series, and means energizing the input circuit of the third transistor in accordance with the voltage applied to the trip coil and the switch.

5. In a protective-relaying combination for responding to a variable electrical quantity appearing in an electrical system, a circuit interrupter having a current-responsive tripping device, a tripping unit having a current output to the tripping device dependent on an input to the tripping unit, a relay unit responsive to a condition of an electrical system to be protected for supplying said input to the tripping unit to trip the circuit interrupter, said trippiing unit comprising a controlled device having an input circuit and an output circuit, said output circuit having an impedance dependent on the condition of the input circuit, a first source of voltage dependent on the output of the relay unit, a second source of voltage dependent on the supply of current to the tripping device, means connecting the input circuit for energidation from one of said sources and the output circuit for energization by the other of said sources, and a signaling device responsive to current flow in said output circuit for producing a signal, said signaling device including means responsive to production of said signal for maintaining the signal regardless of the values of said voltages.

6. In a protective-relaying combination for responding to a variable alternating electrical quantity appearing in an electrical system, shaping means for deriving from said electrical quantity a shaped quantity, and a relay device responsive to said shaped quantity, said shaping means comprising a rectifier having an input dependent on the alternating electrical quantity and having an output circuit including two series connected parts, each of said parts comprising a separate Zener diode and a resistor, the energization of said relay device being dependent on the voltage drop across one of said parts.

7. In a current responsive tripping device, a tripping unit having output terminals and an input terminal, a pair of power supplying terminals, a gate device comprising a main path and a control means for initiating current flow through said main path, a power circuit connecting said power terminals to said output terminals, a first control circuit connecting said input terminals to said control means of said gate device, said control circuit being effective to change the conductive condition of said main path of said gate device in response to a predetermined energized condition of said input terminals, a switching device having a main path and a control means for initiating current flow through the said main path, a signalling network connected for energization from said power terminals and including said main path of said switching device, said signalling network being rendered effective to provide its output signal in response to the initiation of conduction in said main path of said switching device, a controlled device having a control connection and an output connection, a first control network connecting said control connection to said power circuit for energization as a function of a change in the energized condition of said power circuit, a second control network connected to said main path of said gate device and to said control means of said switching device and including said output connection of said controlled device, said second network being effective to actuate said control means of said switching device to initiate current flow in said main path of said switching device and thereby rendering said signalling network effective as a consequence of a change in the energized condition of said output connection of said controlled device, and means connected in one of said control networks for preventing said change in the energized condition of said output connection of said controlled device unless the conductive condition of said main path of said gate device has been changed.

8. The combination of claim 7 in which said last-named means is an asymmetrical device poled to provide a high impedance to energy flow from said output terminals to said switching device.

9. The combination of claim 8 in which said switching device is of the discontinuous type in which its said control means is effective solely to control the initiation of conduction through its said main path, and selectively operable means in said signalling network to interrupt the flow of current through said main path of said switching device to reestablish control of said main path of said switching device by said control means of said switching device.

10. The combination of claim 8 in which said asymmetric device is a rectifier and said rectifiers are connected in said power circuit intermediate the connection of said second control network to said main path of said gate device and the one of said output terminals to which said just mentioned connection is connected.

References Cited

UNITED STATES PATENTS 2,920,242   1/1960   Koss _____ 317—36
3,105,920   10/1963   Dewey _____ 317—36

LEE T. HIX, Primary Examiner

J. D. TRAMMELL, Assistant Examiner

U.S.Cl. X.R.

317—36, 142, 148.5, 151